(12) United States Patent
McCormick

(10) Patent No.: US 6,659,824 B1
(45) Date of Patent: Dec. 9, 2003

(54) ANIMAL LIFE PRESERVERS

(76) Inventor: Daniel Richard McCormick, 524 Point Field Dr., Millersville, MD (US) 21108

(*) Notice: Subject to any disclaimer, the term of this patent is extended or adjusted under 35 U.S.C. 154(b) by 38 days.

(21) Appl. No.: 10/144,970

(22) Filed: May 14, 2002

(51) Int. Cl.[7] .................................................. B63C 9/08
(52) U.S. Cl. ........................................ 441/88; 106/123
(58) Field of Search ............................. 441/80, 88, 106, 441/111, 113, 122, 123

(56) References Cited

U.S. PATENT DOCUMENTS

| | | |
|---|---|---|
| 4,489,677 A | 12/1984 | Handley |
| 4,831,967 A | 5/1989 | Anderson |
| 5,044,321 A | 9/1991 | Selph |
| 5,149,271 A | 9/1992 | Marvich |
| 5,632,235 A * | 5/1997 | Larsen et al. ............. 119/856 |
| 5,894,817 A * | 4/1999 | Manuel ..................... 119/497 |
| 6,350,168 B1 * | 2/2002 | Kroll et al. ................ 441/111 |

FOREIGN PATENT DOCUMENTS

| | | |
|---|---|---|
| CA | 1194738 | 10/1985 |
| GB | 2157937 | 11/1985 |

* cited by examiner

*Primary Examiner*—Stephen Avila

(57) ABSTRACT

A life preserver for use by a four-legged animal for supporting the animal in a generally horizontal, partially submerged state of floating equilibrium in a body of water. The life preserver includes an inflation chamber; and a harness system connected to the inflation chamber for attaching the life preserver to an animal, wherein when worn inflated, the life preserver maintains an animal at or near the surface of the water, with the animal's head out of the water. The harness system comprises at least one adjustable harness for encircling the chest and waist areas of an animal. The inflation system includes at least one of a manual inflation system, an automatic inflation system and an oral inflation tube. When uninflated, the inflation chamber is adapted to be folded over and packed within a shroud. The inflation system may be automatic $CO_2$ inflation system or a manually activated $CO_2$ inflation system.

20 Claims, 12 Drawing Sheets

ANIMAL LIFE PRESERVERS

BACKGROUND OF THE INVENTION

1. Field of the Invention

This invention relates to animal life preserver devices and methods of making same.

2. Background of the Invention

Animal owner's often take their animals out on boats. In the same way and for the same reasons that it is desirable for humans to wear life preservers while out on or near water, it is also desirable for animals to wear life preservers. Existing life preservers have a number of problems and shortcomings which make them undesirable. These shortcomings and problems usually result in the life preservers not being worn which in turn can result in tragic loss of an animal to drowning.

Known, existing life preservers are generally using flotation devices that make them uncomfortable for animals. In addition, such known life preservers may be attached to animals in such a way as to make them unsafe.

BRIEF DESCRIPTION OF THE DRAWINGS

The above and other objects, features and advantages of the invention will now be described in more detail with reference to the accompanying figures in which.

DETAILED DESCRIPTION OF PRESENTLY PREFERRED EMBODIMENTS

Overview

Figure 1:
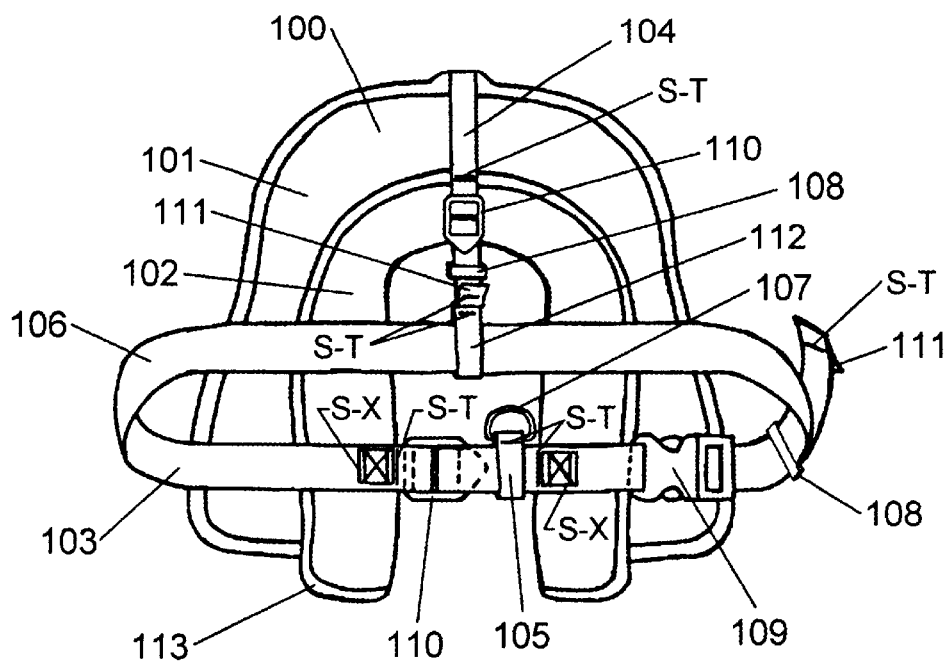
FIGS. 1 and 2 show a back-side and front-side views, respectively, of a configured single harness device according to embodiments of the present invention.

In preferred embodiments, this invention is an inflatable animal life preserver device that is for use by dogs, cats, and other four-legged animal that may need protection from drowning when taken aboard a boat or vessel, where the owner wishes to provide a flotation device for their cherished pet or valuable property. The various figures provide an overview of the details of the various embodiments of the invention. The invention is preferably configured, sized, and designed to be quickly donned on the animal by the use of quick release buckles and slides and adjusting straps on the harness. When placed in water the device preferably inflates automatically. However, the device may also be inflated manually (in or out of water), e.g., by pulling down on an inflation lanyard that is preferably provided on the device. When inflated, the buoyancy of the device will float the animal in a horizontal position and will not interfere with the animal's ability to "dog paddle". While the animal will be suspended in equilibrium in a partially-submerged state, the animal's head will be well clear of the water.

The functional characteristics of the invention include the full size range of all four-legged animals. Each size inflatable animal device will be sized to fit the animal's body characteristics and to provide the proper amount of buoyancy needed properly float the animal based on the animal's shape and in-water weight. One skilled in the art would be able to determine, for each animal, appropriate dimensions for the flotation device according to the present invention.

In preferred embodiments, the invention consist of a Radio-Frequency (R-F) welded inflation chamber, a manual/automatic inflation system, $CO_2$ cylinder (sized for the amount of buoyancy needed for that size device) an oral inflation tube, a shroud, webbing (for the neck strap, lifting straps, and harness), buckles, slides, belt loops, tie tape (optional), Velcro® type hook and loop fastener, thread, and retro-reflective material (optional). Because four-legged animals are not generally tough to pull a lanyard during an emergency, the device is shown in the drawings using a manual/automatic inflation system, the invention includes devices where the application (such as on a submersible vessel or commercial airlines) would call for a manually and/or oral inflation system. This device has a unique design to be lightweight and comfortable for the animal, and when inflated provide the buoyancy needed to assist the animal for a long period of time.

Figure 2:
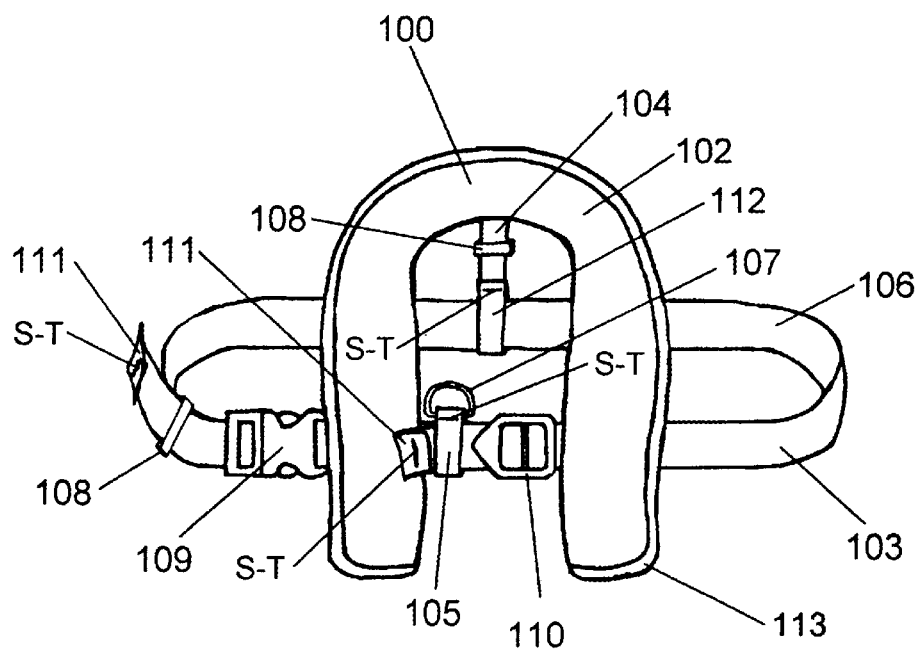

FIGS. 1 and 2 show a back-side and front-side views, respectively, of a configured single harness device according to embodiments of the present invention.

As shown in FIG. 1, the harness device 100 according to the present invention includes an inflation chamber 101 connected to a shroud 102 in a manner described below. A harness 103 is connected to the shroud 102 and to the inflation chamber 101. A neck strap 104 is connected (as described below) to the inflation chamber 101, the shroud 102 and the harness 103.

An optional belt loop assembly 105 may be connected to the harness 103. Preferably the belt loop assembly 105 may be constructed using webbing 106 and may include a D-ring 107 or some other mechanism to attach a leash to the device 100. The harness 103 may also include one or more belt loops 108. The harness 103 preferably includes a quick release mechanism, e.g., a buckle 109. Preferably the buckle 109 is used to secure the device 100 to an animal and provide for adjustment of the harness 103 for an appropriately snug fit of the device 100. The buckle 109 may be any standard, well-known adjustable buckle. The harness 103 may also include a slide mechanism 110 on the upper portion of the harness for adjusting shroud gap on back of the animal. Preferably on each of the free ends of the harness a tab assembly 111 may be constructed, to make adjustment easier.

The neck strap 104 may include a loop assembly 112 at one end to connect to the harness 103 and may also include an optional belt loop 108 and a slide mechanism 110. The slide mechanism 110 is used to adjust the fit of the device for a particular animal, under the animal's neck area. In operation, the slide mechanism 110 is preferably adjusted to hold the device 100 close to the animal's chest. Preferably a tab assembly 111 may be constructed on one free end to make adjustment easier.

The shroud 102 may include a binding 113 (such as tie tape) so as to provide a finished edge to the shroud 102. In some embodiments the binding 113 may be reflective.

FIG. 1 shows a configured single harness device 100 as viewed from the back showing how the inflation chamber 101 may appear when unfolded and extending outside of the shroud 102. FIG. 2 shows a front view of the device 100 of FIG. 1 with the inflation chamber 101 stowed inside the shroud 102.

FIG. 1 also shows preferable connection assemblies for the various components of device 100. These connections between components may be made using known ways and methods. However, preferred connection details are described below.

Figure 3:
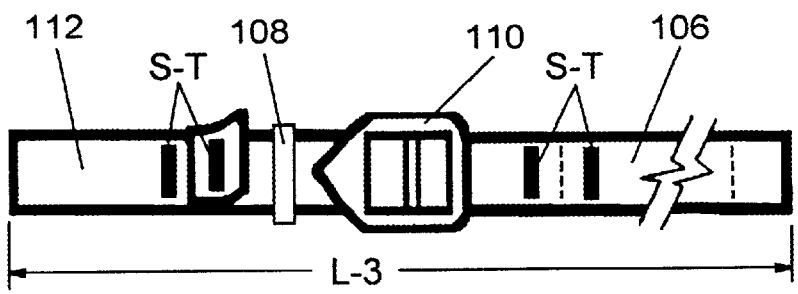
FIGS. 3 and 4 show configuration details that may be used for constructing a neck strap according to embodiments of the present invention.
Figure 4:
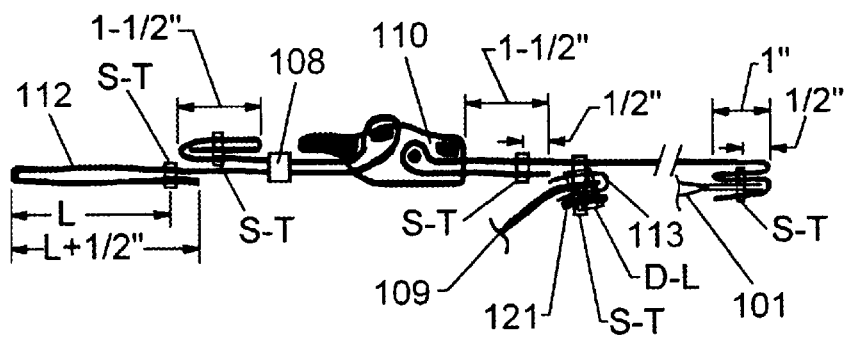

Preferable details for connecting one end of the neck strap 104 to the outer edge of the inflation chamber 101 are shown in FIGS. 3 and 4. Preferably attaching the neck strap 104 to the inflation chamber 101 in this manner and preferably at this optional location may provide for holding the inflated chamber (the section located under an animal's neck, when worn) away from the animal's airway while floating in the water. The neck strap 104 may be connected to the outer edge of the shroud 102 by bar-tack stitching (depicted as S-T in FIG. 1 and FIG. 4) or by some other means. Preferable connection details for connecting the neck strap 104 to the shroud 102 are shown in FIG. 4. Preferably attaching the neck strap 104 to the shroud 102 at this optional location should hold the shroud down under the animal's neck and may prevent forces from an animal's movement from opening this section of the shroud.

The neck strap 104 is preferably comprised of two subassemblies, an upper neck strap assembly 104-A and a lower neck strap assembly 104-B (as shown in FIGS. 5 through 8). The upper neck strap assembly 104-A may have a slide assembly 110 on one end. The lower neck strap assembly 104-B may have a loop assembly 112 formed on one of its ends. The other end of the lower neck strap assembly 104-B may have a tab assembly 111 as shown in FIGS. 1, 3, 4, 7, and 8).

Preferably the webbing 106 from the lower harness section 103-B may pass through the neck strap 104 (lower neck strap assembly 104-B), and preferably through the loop assembly 112, or may use some other means to connect the neck strap to the harness. The optional loop assembly 112 on the neck strap can allow the neck strap to be self-centering as the harness is adjusted. The preferable location of the neck strap is on the animal's chest between the front legs.

FIGS. 3 and 4 show configuration details that may be used for constructing a neck strap 104 according to embodiments of the present invention, comprising of an upper neck strap 104-A and lower neck strap 104-B assemblies, as shown, e.g., in FIGS. 3 through 8. Preferably the neck strap is constructed using two sections of webbing 106, a slide 110, an optional belt loop 108, an optional loop assembly and a tab assembly. Preferably the upper and lower neck strap assemblies are connected by lacing the free end of the lower neck strap assembly 104-B, through the optional plastic belt loop 108, and through and around a center bar of the slide 110 and back under the slide and over the top of the webbing 106 and then may be laced through the optional plastic belt loop 108. Preferably the upper neck strap assembly is connected to the inflation chamber assembly 101, preferably at the outer edge of the back side of the shroud cover. Preferably the free cut end of webbing 106 of the upper neck strap assembly 104-A is connected to the inflation chamber 101 (as shown in FIG. 4) by first overlapping the outer edge of the inflation chamber material 114 followed by doubling over of the webbing 106. Next the five layers of fabric (one layer of webbing 106, two layers of inflation chamber fabric 114, and two layers of webbing 106) may be connected simultaneously using bar-tack stitching (S-T in FIG. 4), or by using some other means. Preferably the webbing of the uppers neck strap assembly 104-A may be connected, near the slide 110, to the outer edge of the back side of the shroud 102 using bar-tack stitching (S-T in FIG. 3B), or by using some means.

Figure 5:
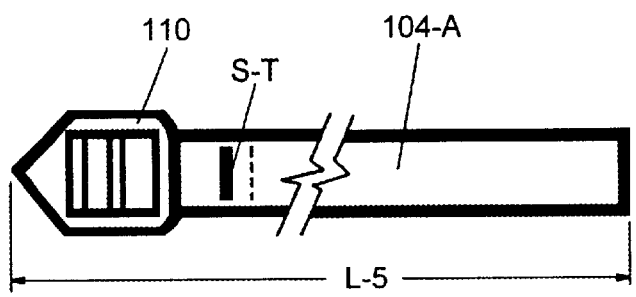
FIGS. 5 and 6 show configuration details that may be used for an upper neck strap assembly according to embodiments of the present invention.
Figure 6:
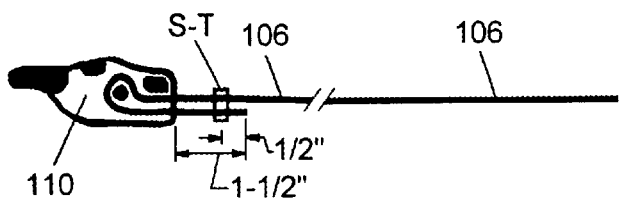

FIGS. 5 and 6 show configuration details that may be used for an upper neck strap assembly 104-A according to embodiments of the present invention. Preferably, one cut end is laced through the slide 110 as shown in FIGS. 5 and 6 and looped back under the webbing. The end may extend approximately 1½ inches beyond the slide, and may be secured using bar-tack stitching (S-T) through the two layers of webbing 106 located approximately ½-inch from the cut end, or by using some other means.

Figure 7:
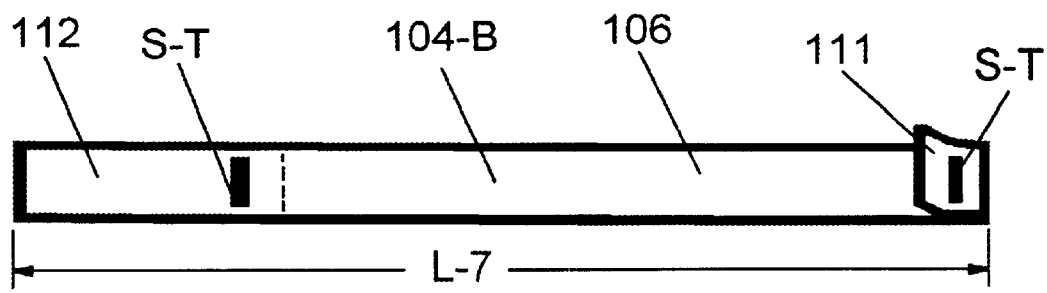
FIGS. 7 and 8 show configuration details that may be used for a lower neck strap assembly according to embodiments of the present invention.
Figure 8:
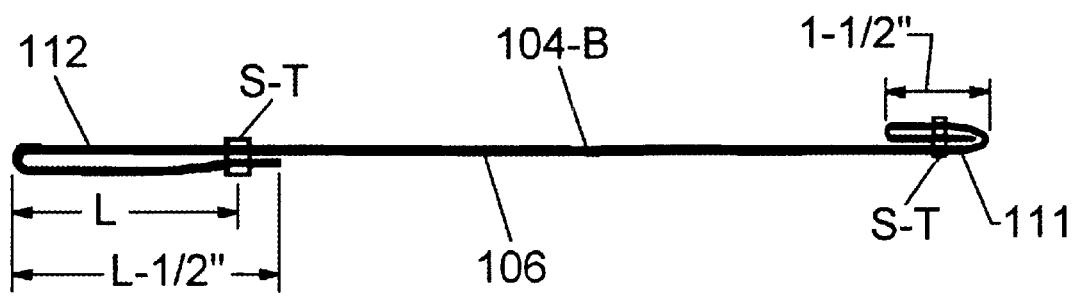

FIGS. 7 and 8 show configuration details that may be used for a lower neck strap assembly 104-B according to embodiments of the present invention. Preferably a loop assembly 112 may be formed on one end and a tab assembly 111 may be formed on the other end.

Figure 9:
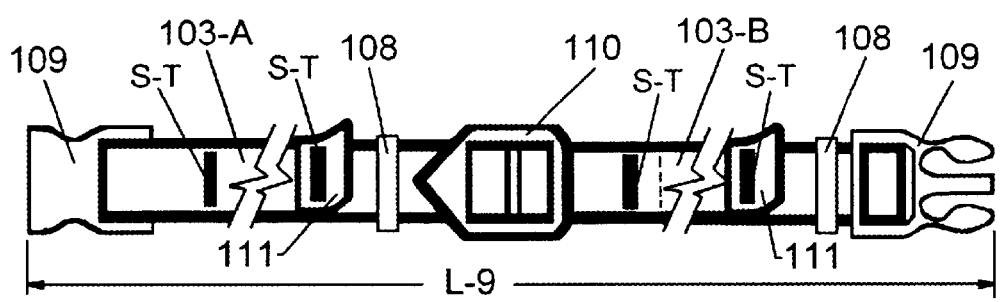
FIGS. 9 and 10 show configuration details that may be used for constructing a single harness according to embodiments of the present invention.
Figure 10:
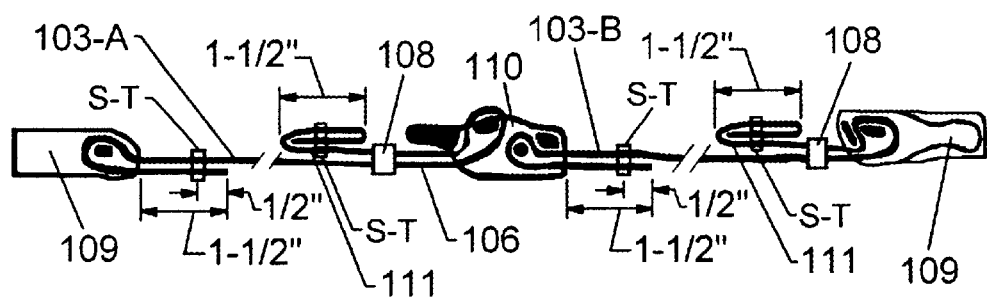
Figure 13:
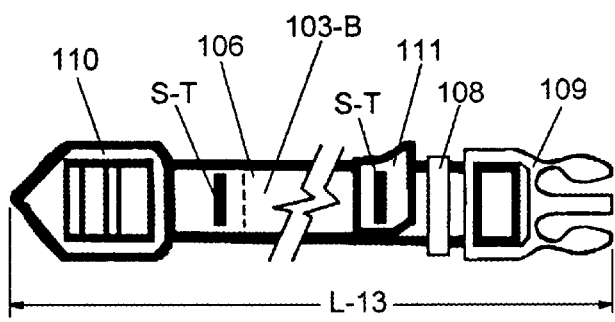
FIGS. 13 and 14 show configuration details that may be used for a lower harness according to embodiments of the present invention.
Figure 14:
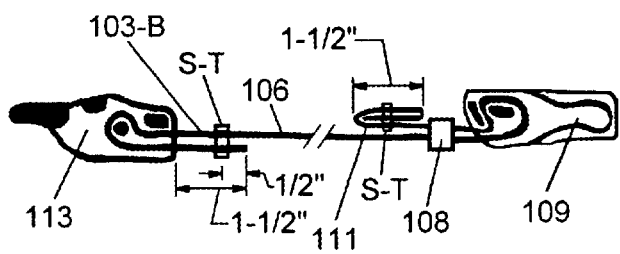

FIGS. 9 and 10 show configuration details that may be used for constructing a single harness 103 according to embodiments of the present invention, comprising of an upper harness assembly 103-A (11 and 12) and the lower harness assembly 103-B (FIGS. 13 and 14). Preferably each harness is constructed using a buckle 109, a slide 110, optional plastic belt loop(s) (108), an optional belt loop assembly 105 and two sections of webbing 106. Preferably the upper and lower harness assemblies 103-A and 103-B are connected by lacing the free end of the lower harness 103-B with the tab assembly, through the optional plastic belt loop 108, and through and around the center bar of the slide 110 and back under the slide and over the top of the webbing, and then may be laced through the optional plastic belt loop 108.

Figure 11:
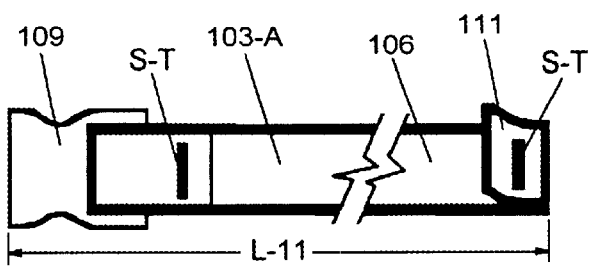
FIGS. 11 and 12 show configuration details that may be used for an upper harness according to embodiments of the present invention.
Figure 12:
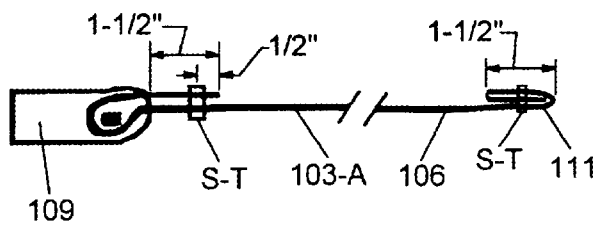

FIGS. 11 and 12 show configuration details that may be used for an upper harness 103-A according to embodiments of the present invention, which may comprise a female section of a buckle 109 and one section of webbing 106. Preferably one end of the webbing is finished off with a tab assembly 11. Preferably, the other end of the webbing is laced through the female end of the buckle 109 and preferably back under the webbing 106, and may extend approximately 1½ inches beyond the buckle 109, and secured using bar-tack stitching (S-T) through the two layers of webbing 106 located approximately ½-inch for the cut end, or by using some other means.

FIGS. 13 and 14 show configuration details that may be used for a lower harness 103-B according to embodiments of the present invention, which may comprise of a slide 110, the male section of a buckle 109 and optional plastic belt loop 108, and one section of webbing 106. Preferably one end of the webbing 106 may be finished off with a tab assembly 111. Preferably, the other cut end of the webbing 106 is laced through the second bar of the slide 110 and back under the webbing 106 and may extend approximately 1½ inches beyond the slide 110, and may be secured using bar-tack stitching (S-T) through the two layers of webbing 106 located approximately ½-inch from the cut end, or by using some other means. Preferably the other end of the webbing 106 may be finished with a tab assembly 111 that may be laced through the optional plastic belt loop 108, and then preferably laced through the male section of the buckle 109 and preferably back under the optional plastic belt loop 108, if provided.

The inflation chamber 101 is now described with reference to FIGS. 15 through 19. (The letters in FIGS. 15 and 16 give dimensional values for some embodiments of this invention and are discussed in greater detail with reference to Table 3 below).

Figure 15:
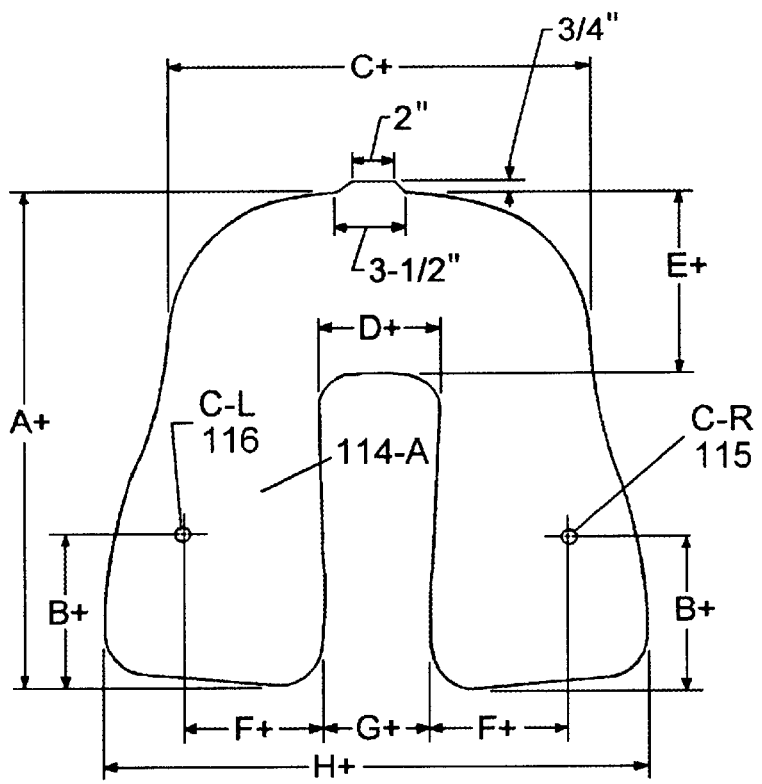
FIG. 15 shows a cutting pattern for the inflation chamber 101 according to embodiments of the present invention.

FIG. 15 shows a cutting pattern for the inflation chamber 101 according to embodiments of the present invention, and may be used for cutting the front side 114-A and back side 114-B of the inflation chamber fabric 114. Preferred specifications of the fabric 114 are given in Table 2. The fabric 114 should be able to be R-F sealed. The front and back are preferably cut the same expect that there may be two holes cutouts (C-L and C-R) on preferably located on the front side chamber material. Each of the cutouts maybe sized for sealing an optional oral inflation tube 115 preferably located on the right of the front side of the chamber fabric and for sealing the inflation manifold for installing the automatic inflation system 117 (or the manual inflation system 118) preferably located on the left of the front side of the camber fabric.

Figure 16:
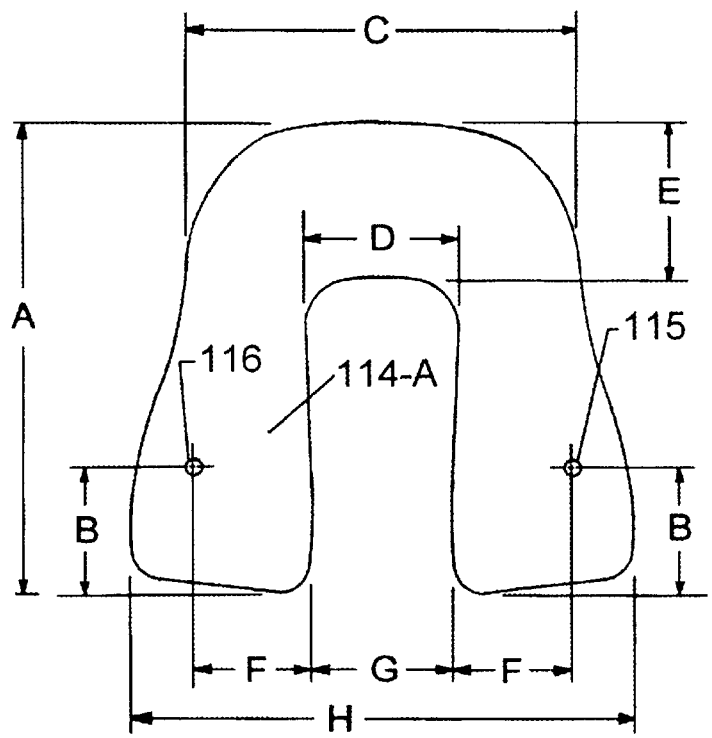
FIG. 16 shows the Radio-Frequency (R-F) weld seal pattern for sealing the inflation chamber 101 fabric, the optional inflation system and the optional oral inflation tube, according to embodiments of the present invention.

FIG. 16 shows the R-F weld seal pattern for sealing the inflation chamber 101 consisting of front and back chamber compartment fabric 114, the optional automatic inflation system 117 (or the manual inflation system 118) and the optional oral inflation tube 115, according to embodiments of the present invention. The preferable order for sealing the inflation chamber 101 assembly is to first seal the optional automatic inflation system 117 (or the manual inflation system 118) and the optional oral inflation tube 115, either separately or at the same time. After these seals have cooled, the front and back chamber fabric 114 may be aligned one on top of the other (so that their heat sealable polyurethane coated surfaces face one another), and then chamber fabric 114 may be R-F sealed around the complete circumference of the pattern. Preferably fabric measuring at least ¹¹⁄₁₆-inch will remain outside of the seal around the full circumference of the inflation chamber. All seam dimensions are typically measured from inside seam to inside seam.

Figure 17:
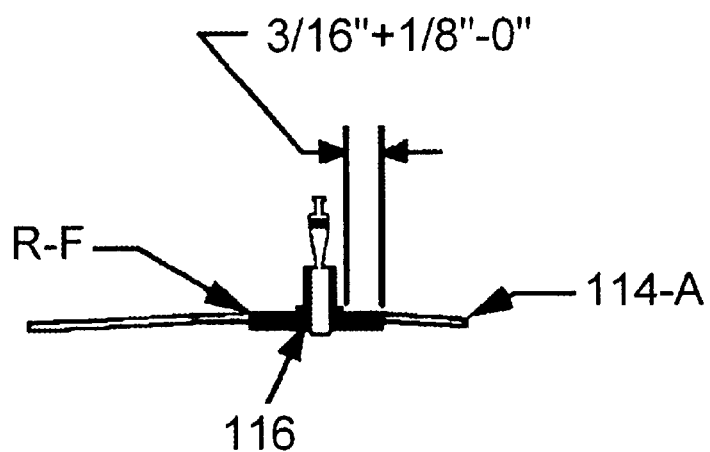
FIG. 17 shows seal details for an R-F weld seam that may be used to seal an optional inflator manifold to the front side of the inflation chamber fabric according to embodiments of the present invention.

FIG. 17 shows seal details for an R-F weld seam that may be used to seal an optional inflator manifold 116 to the front side of the inflation chamber fabric 114 according to embodiments of the present invention. The preferable seal width around the circumference of the optional inflator manifold 116 may vary from ³⁄₁₆-inch to ⁵⁄₁₆-inch.

Figure 18:
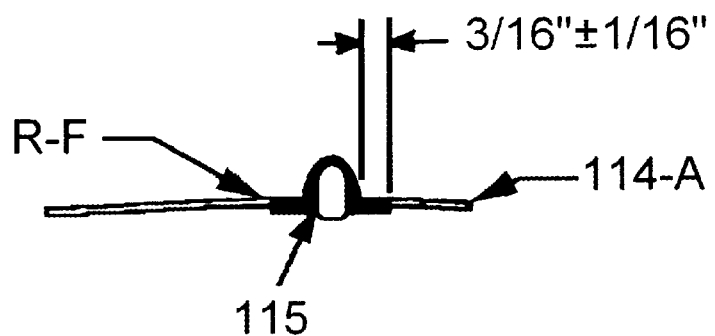
FIG. 18 shows seal details for an R-F weld seam that may be used to seal an optional oral inflation tube to the front side of the inflation chamber fabric according to embodiments of the present invention.

FIG. 18 shows seal details for an R-F weld seam that may be used to seal an optional oral inflation tube 115 to the front side of the inflation chamber fabric 114 according to embodiments of the present invention. The preferable seal width around the circumference of the optional inflation tube 115 may vary from ⅛-inch to ¼-inch.

Figure 19:
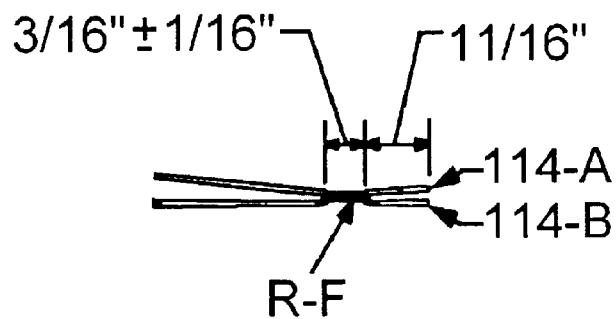
FIG. 19 shows seal details for an R-F weld seam that may be used to seal two sides of the inflation chamber fabric, according to embodiments of the present invention.

FIG. 19 shows seal details for an R-F weld seam that may be used to seal the circumference of the two sides (front and back) of the inflation chamber fabric 114, according to embodiments of the present invention. The preferable seal width used around the full outside circumference (FIG. 16) to form the inflation chamber 101 may very form ⅛-inch to ¼-inch.

Figure 20:
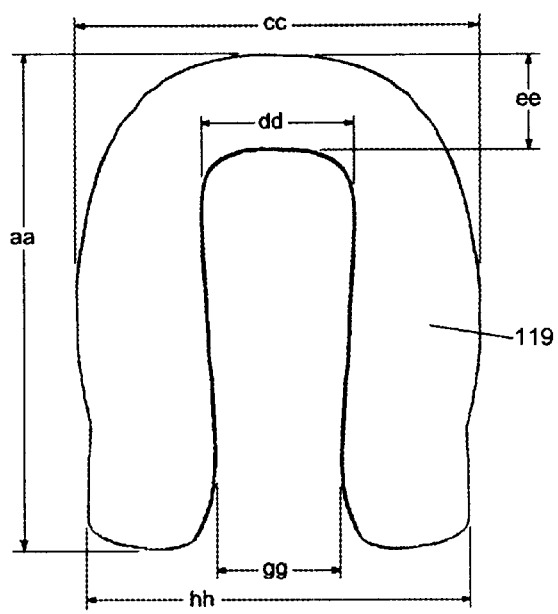
FIG. 20 shows a cutting pattern for a shroud that may be used for cutting two covers of the shroud fabric, according to embodiments of the present invention.

FIG. 20 shows a cutting pattern for a shroud 102 that may be used for cutting the two shroud covers (front 119-A, and back 119-B) using fabric 119 according to embodiments of the present invention. The two shroud covers 119 are preferably identically cut to the shape shown in FIG. 20. Different size devices may use this shape when sizing to accommodate the inflation chamber 101 and harness 103 configurations being used on the device. The cutting pattern shown in FIG. 20 is preferably for a device with the optional tie tape 113 being attached. The preferable pattern for a device without the optional tie tape is typically increased by a ½-inch (or as may be necessary) around the outside perimeter (FIGS. 21 and 22) to accommodate turning the fabric under so that a finished edge may be provided on the shroud 102.

Figure 21:
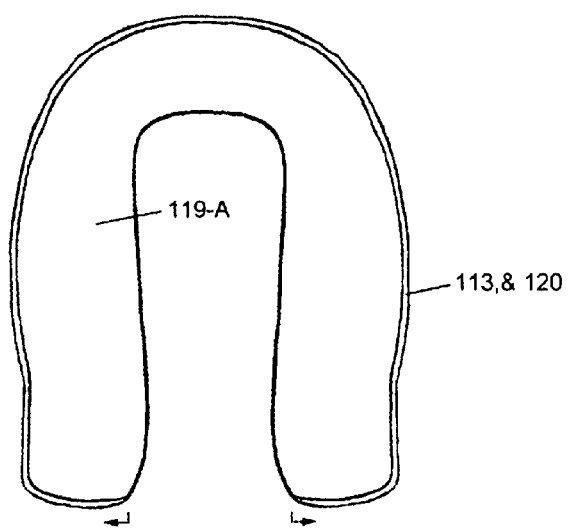
FIGS. 21 and 22 show stitching that may be used to connect an optional tie tape to each of the two shroud covers according to embodiments of the present invention.
Figure 22:
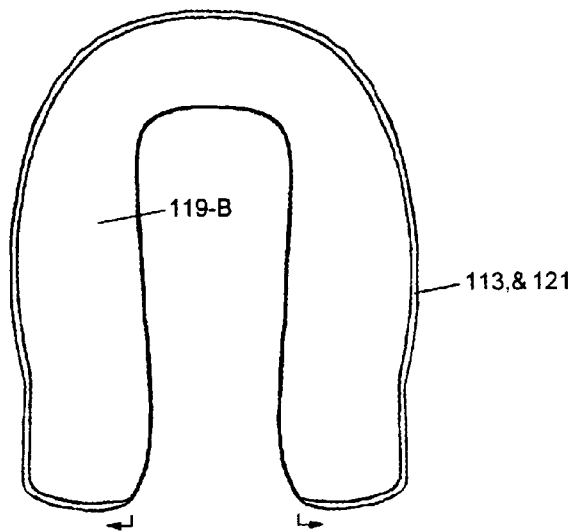

FIGS. 21 and 22 show stitching that may be used to connect an optional tie tape and appropriate fastener (hook or loop) to each of the two shroud covers along the outer perimeter according to embodiments of the present invention. FIG. 21 depicts the front shroud cover and FIG. 22 depicts the back shroud cover. FIG. 21 preferably shows the stitching pattern that may be used for connecting the optional tie tape 113 and hook fastener 120 to the front shroud cover fabric 119-A, and FIG. 22 preferably shows the stitching pattern that may be used for connecting the optional tie tape 113 and loop fastener 121 to the back shroud cover fabric 119-B. The preferable stitching for connecting the tie tape and appropriate fastener (hook or loop) to the shroud cover fabric may be by using a double needle type 301 lockstitch with 3/16-inch distance between the needles.

Figure 23:
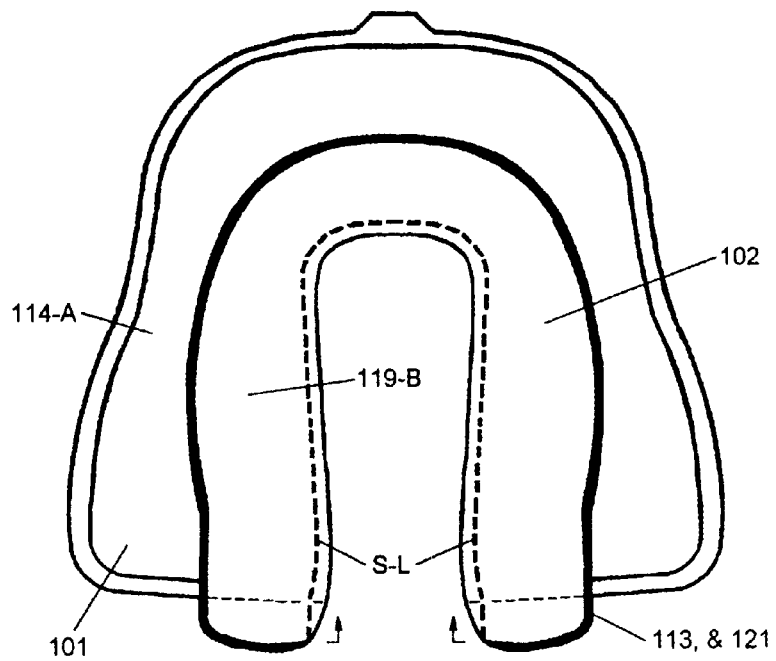
FIG. 23 shows stitching that may be used to connect the inflation chamber to the two shroud covers according to preferred embodiments of the present invention.
Figure 24:
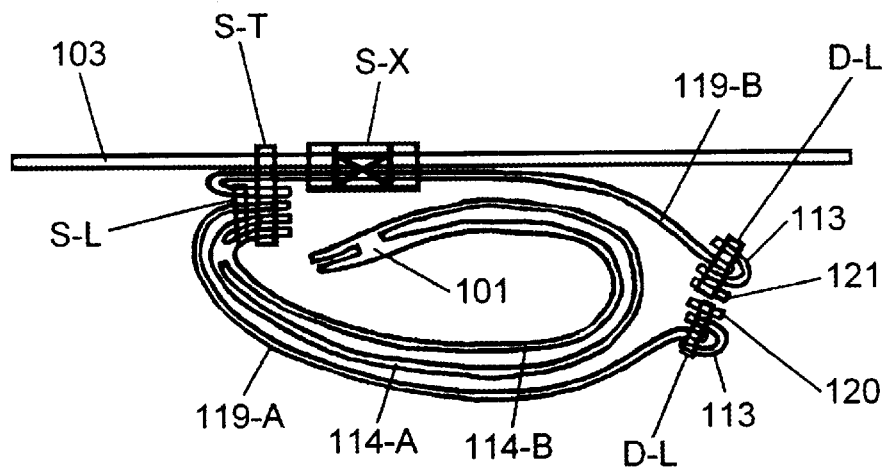
FIG. 24 shows stitching details that may be used to connect an assembled shroud cover with inflation chamber to an upper harness and to a lower harness, according to embodiments of the present invention.

FIG. 23 shows stitching that may be used to connect the inflation chamber assembly 101 to the two shroud covers 119-A and 119-B according to preferred embodiments of the present invention. The inflation chamber assembly 101 and the two shroud covers 119 may be attached by lock-stitching (S-L) around the full inside seams. Alternatively, the two shroud covers 119-A and 119-B may be formed into the shroud assembly 102 prior to connecting it to the inflation chamber assembly 101. Preferably after these two assemblies have been attached, the harness 103 may be connected by lock-stitch seam using preferably a bar-tack stitch that may join the three assemblies together at preferably two locations for each harness, as shown in FIGS. 1 and 24. As shown in FIGS. 1 and 24, additional reinforcement may be provided at two or more locations (depicted by S-X) for each harness, and preferably the harness may be connected to the underside of the shroud, using, e.g., box-x stitching (S-X), preferably next to the bar-tack stitching (S-T), as shown on FIGS. 1 and 24, or they may be attached using some other means. This invention includes multiple harness devices based on the size of the device. For example a three harness device may be constructed using three harnesses, whereby each assembly may be attached to each sections of the harness in the preferable manner, expect the location of the attachments might depend on the size of the device needed for a snug fit for the intended animal.

FIG. 24 shows stitching details that may be used to connect an assembled shroud cover 102 with inflation chamber 101 to an upper harness 103-A and to a lower harness 103-B, according to embodiments of the present invention. Preferably, bar-tack stitch (S-T) through the six layers of material of the two assemblies consisting of one layer of webbing 116, two layers of the back shroud cover fabric 119-B, one layer of the front shroud cover fabric 119-A, and two layers of chamber fabric 114-A and 114-B, preferably in that order as typically shown in the FIG. 24. Preferably this bar-tack stitching (S-T) is located approximately 1/4-inch from the cut edge of the inflation chamber material 114 and may not be stitched through any portion of the inflation chamber seal (see, e.g., FIG. 1 for typical location on the harness 103). Preferably box-x stitching (S-X) may be provide to add reinforcement of the two assembly attachments and may be located next to the bar-tack (S-T), as shown on FIG. 23 (see, e.g., FIG. 1 for typical location on the harness 103). FIG. 24 also shows the stitching details that may be used for connecting the hook fastener 120, the loop fastener 121, and the optional tie tape 113 to each of the front shroud cover 119-A and back shroud covers 119-B (see FIGS. 21 and 22).

Figure 25:
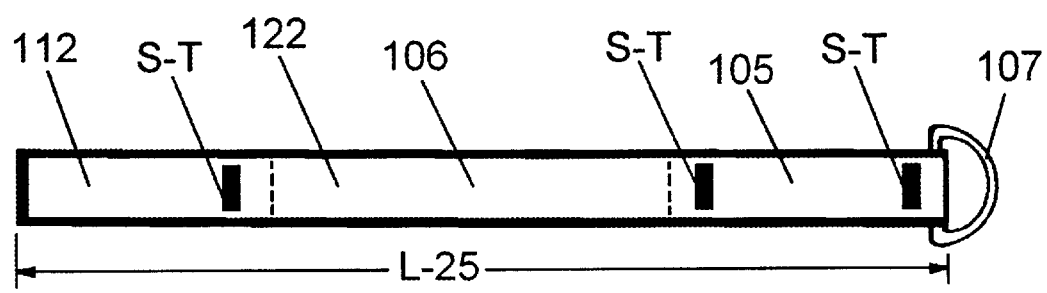
FIGS. 25 and 26 show configuration details of a lifting strap that may be used on a double harness device according to embodiments of the present invention.
Figure 26:
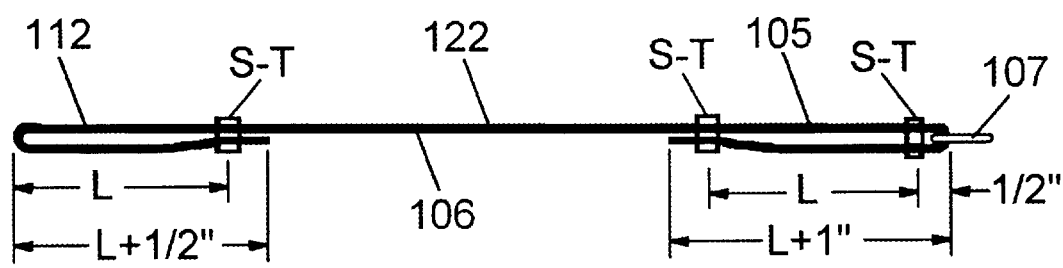

FIGS. 25 and 26 show configuration details of a lifting strap 122 that may be used on a double harness device according to embodiments of the present invention, comprising of a section of webbing 106, with a loop assembly 112 on one end and a loop assembly (with D-ring 107) 105 on the other end. If the D-ring 107 is not provided the lifting strap 122 may be constructed using a loop assembly 112 at both ends.

Figure 27:
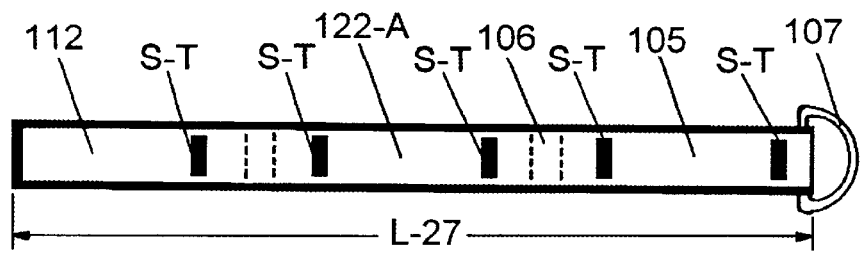
FIGS. 27 and 28 show configuration details of a lifting strap with inner loop assembly that may be used on a triple harness device according to embodiments of the present invention.
Figure 28:
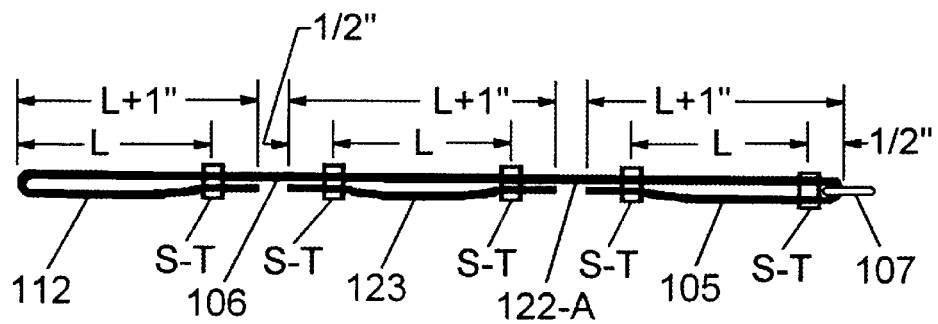

FIGS. 27 and 28 show configuration details of a lifting strap with inner loop assembly 122-A that may be used on a triple harness device according to embodiments of the present invention, comprising of two sections of webbing 106 with a loop assembly 112 on one end and a loop assembly (with D-ring 107) 105 on the other end, and an inner loop assembly 123 located as may be appropriate for the harness 103 of the device.

Figure 29:
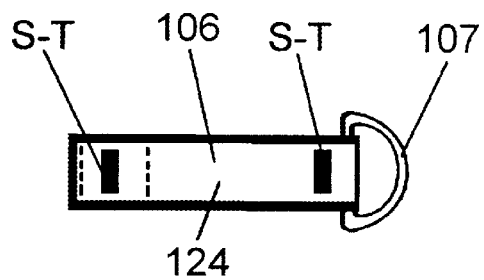
FIGS. 29 and 30 shows configuration details of a single belt loop assembly with an attached D-Ring that may be used on a single harness device according to embodiments of the present invention.
Figure 30:
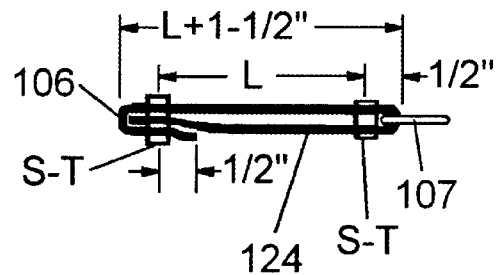

FIGS. 29 and 30 show configuration details of a belt loop assembly with D-ring 124, comprising of one sections of webbing 106 and a D-ring 107 one end. Preferably this belt loop assembly with D-ring 124 may be used on a single harness device 100 to provide an attachment point (to any section) and may be used as a place for attaching a leash.

Figure 31:
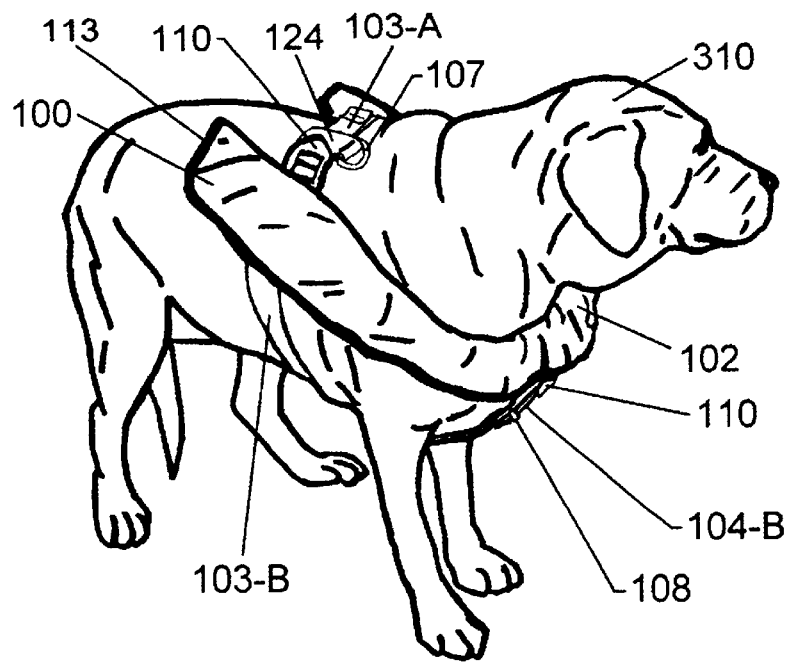
FIGS. 31 and 32 show a configured single harness device, according to embodiments of this invention, worn on a large dog as it may appear when worn, respectively, in an uninflated and in the packed condition (FIG. 31) and when fully inflated (FIG. 32).
Figure 32:
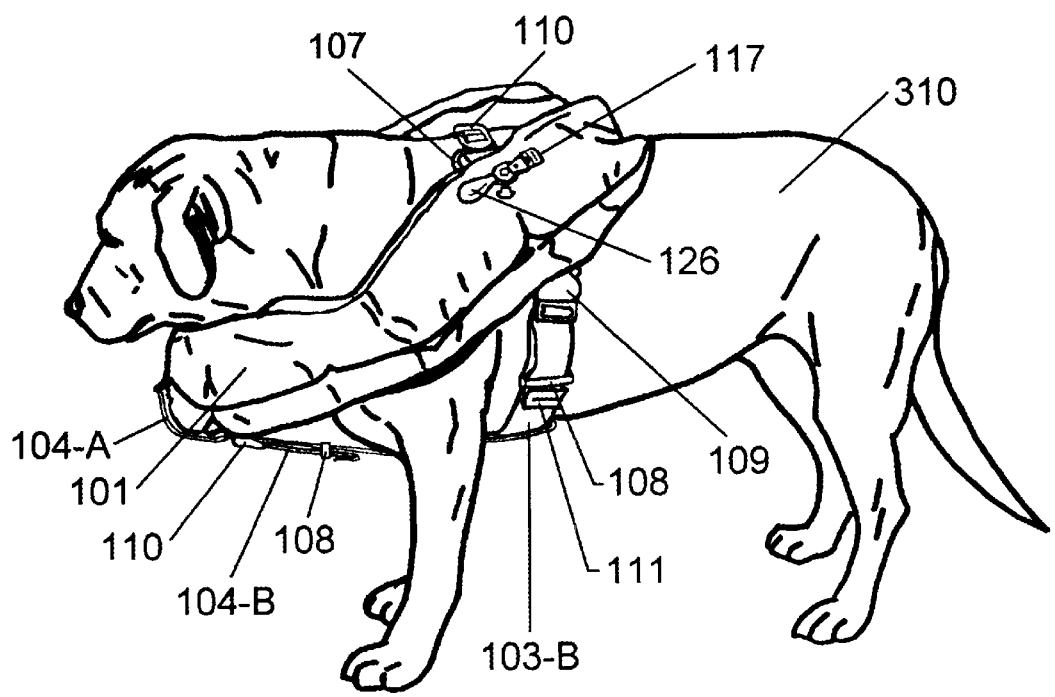

FIGS. 31 and 32 show a configured single harness device 100, according to embodiments of this invention, worn on a large dog 310 as it may appear when worn, respectively, in an uninflated and in the packed condition (FIG. 31) and when fully inflated (FIG. 32). This preferably configured single harness device 100 may be use by large size dogs, large cats or other large four-legged animals.

Figure 33:
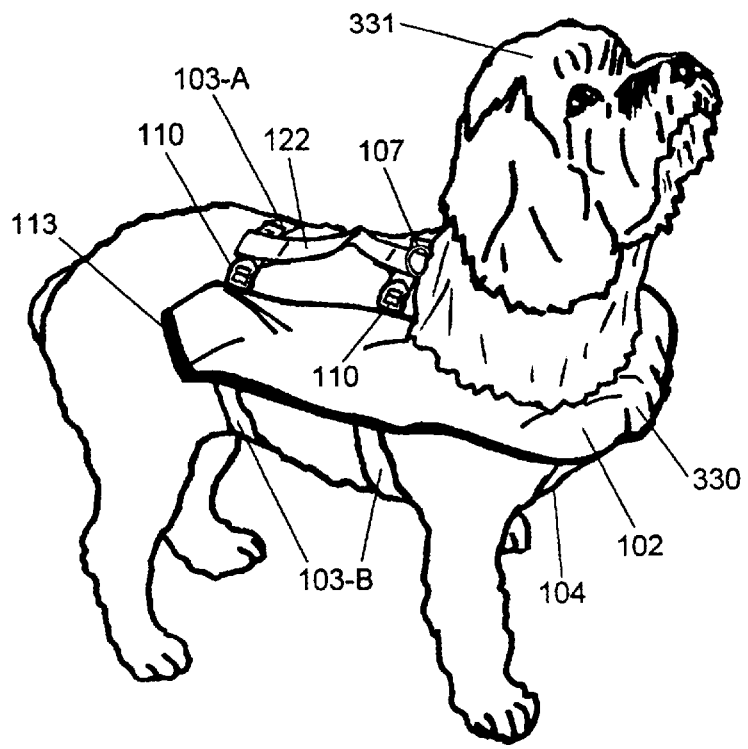
FIGS. 33 and 34 shows a configured double harness device, according to embodiments of this invention, worn on a small dog as it may appear when worn, respectively, in an uninflated and in the packed condition (FIG. 33) and when fully inflated (FIG. 34).
Figure 34:
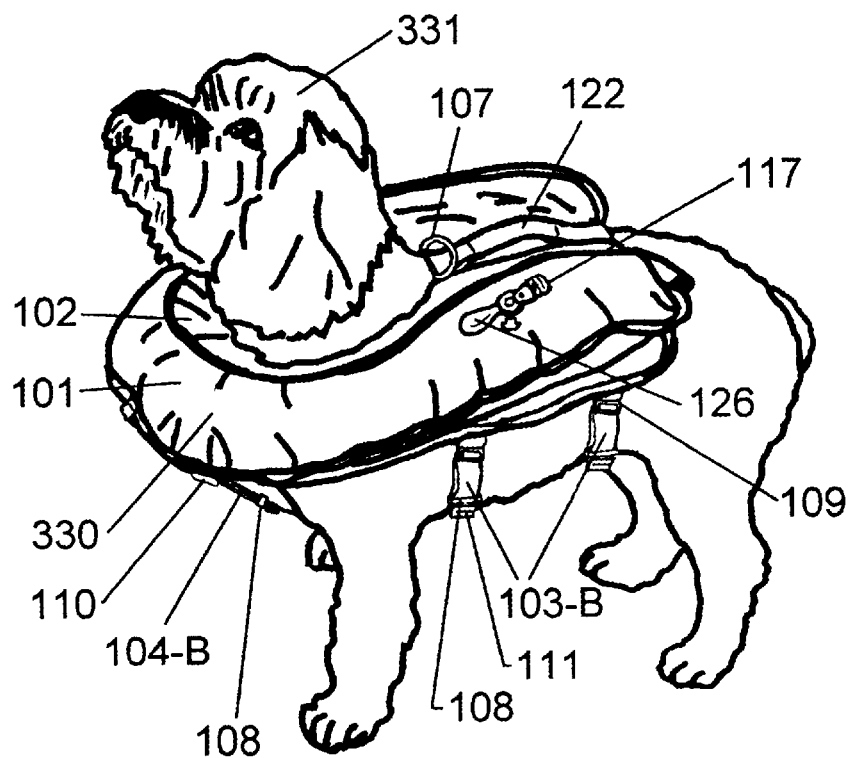

FIGS. 33 and 34 show a configured double harness device 330, according to embodiments of this invention, worn on a small dog 331 as it may appear when worn, respectively, in an uninflated and in the packed condition (FIG. 33) and when fully inflated (FIG. 34). This preferably configured double harness device 330 may be use by small dogs 331, small cats or other small four-legged animals.

The invention preferably uses components that are used in manufacturing of U.S. Coast Guard approved personal flotation devices (PFDs) that are also Underwriters Laboratories© (UL) recognized or listed components for marine applications. The invention may also be constructed using other manufacturer's $CO_2$ inflation systems.

The devices according to the present invention are preferably inflated and the inflation systems shown are manual/automatic inflation system 117, e.g., as manufactured by Halkey-Roberts Corporation. Any other $CO_2$ inflation system with the same characteristics and reliability may be considered as equivalent. The location of the inflation system is shown in FIGS. 32 and 34, although these locations may vary to accommodate the specific animal and size range. This invention also includes the use of a manual inflation system 118, where the use of an automatic inflation system 117 would not be appropriate, such as may be used on an aircraft or submersible vessel.

In some embodiments, the invention includes adding thin foam panels 125 (not shown) and sized to fix within the shroud 102 to provide enough inherent buoyancy to non-automatic inflating devices so that the device itself floats if accidentally dropped in the water. This may not be needed on the fully automatic inflatable devices because they will inflate if accidentally dropped in the water.

The invention includes adding thin foam panels (sized to fix within the shroud) under the front side shroud (cover fabric) to provide a smooth outer surface and to hide the outline of inflation system 117 and the $CO_2$ cylinder 126.

FIGS. 4 through 16, 20, and 25 through 28 give dimensions of preferred embodiments of devices according to the invention, as summarized in Table 1. The dimensions are given in inches.

TABLE 1

Preferably Dimensional Values

| FIG/Size | Symbol/Value (inches) | | | | | | | |
|---|---|---|---|---|---|---|---|---|
| FIG. 15 | A+ | B+ | C+ | D+ | E+ | F+ | G+ | H+ |
| Small | 20⅞ | 6 | 17¼ | 4 | 8⅛ | 5¾ | 3¾ | 22½ |
| Large | 25½ | 7⅜ | 21 | 5½ | 9⅝ | 6⅜ | 4¼ | 26 |
| FIG. 16 | A | B | C | D | E | F | G | H |
| Small | 18⅞ | 5 | 15¼ | 6 | 6⅛ | 4¾ | 5¾ | 20½ |
| Large | 23½ | 6⅜ | 19 | 7½ | 7⅝ | 5⅜ | 6¼ | 24 |
| FIG. 20 | | aa | cc | dd | ee | | gg | hh |
| Small | | 16¾ | 13 | 4 | 3½ | | 3¾ | 12¾ |
| Large | | 20½ | 16 | 5½ | 4 | | 4¼ | 15¾ |

| Neck Strap 104 | | Upper Neck Strap 104-A | | Lower Neck Strap 104-B | |
|---|---|---|---|---|---|
| FIG. 3 | L-3 | FIG. 5 | L-5 | FIG. 7 | L-7 |
| Small | 13 | Small | 7 | Small | 9½ |
| Large | 27 | Large | 8½ | Large | 22 |

| Harness 103 | | Upper Harness 103-A | | Lower Harness 103-B | |
|---|---|---|---|---|---|
| FIG. 9 | L-9 | FIG. 11 | L-11 | FIG. 13 | L-13 |
| Small | 31 | Small | 15 | Small | 20 |
| Large | 47 | Large | 23 | Large | 29 |

| Lifting Strap 122 | | Lifting Strap with Inner Loop Assembly 122-A | | Belt Loop Assembly with D-ring 124 | |
|---|---|---|---|---|---|
| FIG. 25 | L-25 | FIG. 27 | L-27 | FIG. 30 | L |
| Small | 8 | Small | 8 min | Small | 1¼ |
| Large | 12 min. | Large | 12 min. | Large | 2¼ |

TAB ASSEMBLY CONSTRUCTION—Preferably a tab (233-A or 233-B) may be formed at the end of webbing by folding the end of the webbing twice and may be secured by stitching through the three layers of webbing, preferably at the center of the folds by using a bar-tack stitching (S-T), a box-x stitching (S-X), or by using some other means,.

LOOP ASSEMBLY CONSTRUCTION—A loop assembly 112 may be formed on one end of a webbing 106 by preferably folding over the webbing 106 and may be secured (to itself) by stitching through the two layers of webbing 106 formed by the fold. Preferably the loop assembly 106 may be formed by folding over enough webbing 106 to form a loop of appropriate length and then may be secured (to itself) by stitching through the two layers of webbing 106 at one location using a bar-tack stitching (S-T), a box-x stitching (S-X), or by using some other means, and may be located at a distance of ½-inch from the cut end of the folded webbing 106.

LOOP ASSEMBLY WITH D-RING CONSTRUCTION—A loop assembly with a D-ring 105 may be formed on one end of a webbing 106 by preferably lacing the webbing through the D-ring 107 and then by folding over enough webbing 106 to form a loop of appropriate length and then may be secured (to itself) by stitching through the two layers of webbing 106 at two locations, one preferably at a distance of ½-inch from the cut end of the webbing 106 and the other at a distance of ½-inch from the end of the folded webbing 106 securing the D-ring 107 near the folded webbing 106. Preferably the stitching used may be a bar-tack stitching (S-T), a box-x stitching (S-X), or by using some other means.

BELT LOOP ASSEMBLY WITH D-RING CONSTRUCTION—A belt loop assembly with a D-ring 124 may be formed from one section of webbing 106 may be formed by first lacing the webbing 106 through the D-ring 107 and followed by folding over enough webbing 106 to form a loop of appropriate length and then folding one end of the webbing 106 so as to overlap the other cut end by approximately 1-inch, and the belt loop may be secured using two bar-tack stitching (S-T), one at each end of the loop. Preferably at one end bar-tack stitching (S-T) is used through the three layers of webbing 106 and may be located approximately ½-inch from the folded end. Preferably at the other end with the D-ring 107 bar-tack stitching (S-T) may be used through two layers of webbing 106 and may be located approximately ½-inch for the folded end.

CENTER LOOP ASSEMBLY CONSTRUCTION—Preferably a center (or inner) loop assembly 123 may be formed by attaching a second section of webbing 106 long enough to form a loop of appropriate length, and may be locate on the underside of the lifting strap as depicted in the FIGS. 27 and 28 preferably located as may be appropriate for the harness 103 of the device. Preferably the inner loop assembly 106 is secured by using two sets of stitching through the two layers of webbing 106, preferably one each at a distance of ½-inch from each cut end. Preferably stitching may be a bar-tack stitching (S-T), a box-x stitching (S-X), or by using some other means.

Preferred embodiments of devices according to the present invention also include adding optional retro-reflective material 127 to aid search and rescue operations.

So as not to harm the animal-when lifting it, a double harness device 202 may provide a lifting strap 220 to preferably spread the lifting load.

The Figures depict only two of the many specific sizes and embodiments of this invention. The different size devices may be constructed to fit any size dog or other four-legged animals by selection and connecting the appropriate combinations of the needed assemblies in Table 2, which may include the shroud, lifting strap, harness, inflation chamber, and neck strap. The Figures show preferable locations of the harness, and neck strap with respect to the shroud and the inflation chamber.

Adjustment(s) may be provided on the device to allow for properly locating the device on the animal and may provide for a snug fit. A single harness device may be provided with two adjustments, one maybe provided on the upper harness section (as shown in FIG. 21) and one may be provided on the lower harness section (as shown in FIG. 22). A double harness device may be provided with four adjustments, one may be provided on each upper harness section (FIG. 23) and one may be provided on each lower harness section (FIG. 24).

As noted above, a D-ring 107 may be attached to the device and may provide a place to attach a leash. FIGS. 21 through 24 show preferred means that may be used to connect a D-ring 107 to the upper harness 103-A.

The outer envelope fabric of the shroud 108 may be used to provide protective coverage to the inflation chamber and may include protection from excessive UV from the sun.

While the Figures show a single and double harness device, the invention includes multiple harness devices which may be formed by adding additional single harness, whereby each harness is permanently attached to one another by stitching additional webbing material in same construction method as used to form the double harness device.

Throughout all the figures, same or corresponding component or assembly and corresponding item number are indicated by the same reference numeral as summarized in Tables 2. Table 2 also lists preferred types, sizes and manufactures of some of the various components of devices according to this invention. Where Table 2 identifies various sizes for a component, selection is dependent on the size of the invention. The manufacturer listed for each referenced component in Table 2 is typical, and may be substituted by equivalent component for the invention. Where no type, size or manufacturer is listed, one of ordinary skill in the art would now an appropriate choice to make, based on the animal in question and expected usage requirements.

Guidelines for making the various design choices include the following: a life preserver according to the invention should lift the animal's head out of the water, keeping the animal's airway (mouth and nose) of a conscious or unconscious animal out of the water.

A life preserver according to the present invention should provide enough buoyancy so that the animal is not required to struggle to remain afloat, the animal is able to relax and conserve its energy, thereby reducing its body heat loss, thereby extending the time before hypothermia affects the animal.

A life preserver according to the present invention should reduce the amount of surface that is worn against the animal's body, is comfortable to wear, especially when worn out of water for long periods of time in hot weather.

TABLE 2

Component Reference

| Item No. | Component Type | Type or Size | Typical Manufacturer |
|---|---|---|---|
| 100 | Single Harness Device | | |
| 101 | Inflation chamber | | |
| 102 | Shroud | | |
| 103 | Harness | | |
| 103-A | Upper harness | | |
| 103-B | Lower harness | | |
| 104 | Neck strap | | |
| 104-A | Upper neck strap | | |
| 104-B | Lower neck strap | | |
| 105 | Loop Assembly with D-ring | | |
| 106 | Webbing (harness, neck strap, lifting strap) | 1-inch, or 2-inch | Elizabeth Web, Tape-Craft, or Mills Co. Inc. |
| 107 | D-ring | Model D135W10X12-06-2, 1-inch, Type 302 Stainless Steel | ITW Nexus |
| 108 | Belt Loop | 1-inch or 2-inch | ITW Nexus |
| 109 | Buckle | Model TSR-100, 1-inch, plastic or Model TSR-200, 2-inch, plastic or stainless steel | ITW Nexus |
| 110 | Slide, plastic | Model TLL-75, ¾-inch; Model Superloc, 1-inch; or Model SLL-50, 2-inche | ITW Nexus |
| 111 | Tab assembly | | |
| 112 | Loop Assembly | | |
| 113 | Tie Tape (optional binding for edge of shroud) | Model 7731 (Elizabeth), or N0094 (Tape-Craft), 1-inch, Nylon | Elizabeth Web, Tape-Craft, or Mills Co. inc. |

TABLE 2-continued

Component Reference

| Item No. | Component Type | Type or Size | Typical Manufacturer |
|---|---|---|---|
| 114 | Fabric (chamber compartment) | Model SPO3099 (Mann), or 1647 (URETEK), 200 Denier Nylon 6, 6, Spanish Yellow color 4.2 oz/yd (min). heat sealable polyurethane coating on back, 2000-UV on face | Mann Industries, Inc., or URETEK Inc. |
| 114-A | Front chamber fabric | | |
| 114-B | Back chamber fabric | | |
| 115 | Inflation tube, oral | Model 730ROAxC4 | Halkey-Roberts Corp. |
| 116 | Inflator manifold (automatic and manual inflation system) Valve Core | Model 830011001 832AO | Halkey-Roberts Corp. |
| 117 | Inflation system (manual/automatic) Bobbin (water sensitive element) Bottom gasket Lock Pin Top Gasket | Model V85000GEP4, or V85000GYEP4U V80010 849 2 AM V85006 849 1 AM | Halkey-Roberts Corp. |
| 118 | Inflation system (manual) | Model V840AMUEP4, or V840AMUYP4 | Halkey-Roberts Corp. |
| 119 | Fabric (cover for shroud) | 200 or 108 Denier Type 6, 6 Nylon | Consoltex Inc. |
| 119-A | Front shroud cover | | |
| 119-B | Back shroud cover | | |
| 120 | Hook fastener | ¼-inch, ½-inch, ⅝-inch, or ¾-inch (#65/#1000), | Velcro ® or equivalent |
| 121 | Loop fastener | ¼-inch, ½-inch, ⅝-inch or ¾-inch (#65/#1000) | Velcro ® or equivalent |
| 122 | Lifting strap | | |
| 122-A | Lifting Strap with Inner Loop Assembly | | |
| 123 | Inner Loop assembly | | |
| 124 | Belt Loop Assembly with D-ring | | |
| 125 | Foam panel | | |
| 126 | Cylinder (CO₂ gas) | 12, 16, 20, 23, 25, 35, 38, 45, 60, and 68 gram | Leland Ltd, or iSi Heimsyphon |
| 127 | Retro-reflective (self adhesive) | 3M 3150A SOLAS | 3M |
| 128 | Thread | HB-69, Nylon, Type II, Class A, Size E | Barbour Threads Inc. or American & EFIRD Inc. |
| 310 | Large Dog | | |
| 331 | Small Dog | | |
| 330 | Double Harness Device | | |

While those skilled in the art would know what is meant by the various stitching described herein, the following Table 3 gives preferable requirements for these stitching for preferred embodiments of this invention. Table 3 also provides other reference information.

TABLE 3

Symbol References

| Symbol | Item | Preferably show Requirements |
|---|---|---|
| C-L | Cut-out on Left side | The size of the cutout may be sized for the component that may be sealed to the fabric. |
| C-R | Cut-out on Right side | |
| R-F | Radio Frequency Weld | Preferably one random selected sample out of every 1,000 devices produced may be tested preferably in accordance to ASTM D5034-90, Method G-E, and the preferably breaking load may be 108 pounds force in the warp direction (direction of greater thread count) and may be 180 pounds force in the fill direction (direction of lesser thread count). |
| S-L | Single needle Lockstitch | Preferably the structural stitching may use a Type 301 lockstitch at preferably 7 to 13 stitches per inch of seam. |
| S-T | Single needle Bar-Tack | Preferably the structural stitching may use a Type 301 lockstitch at preferably 7 to 13 stitches per inch of seam and may use a zigzag pattern with width preferably at about 1/-inch. |
| S-X | Single needle Box-X | Preferably the structural stitching may use a Type 301 lockstitch at preferably 7 to 13 stiches per inch of seam and may use a double box-x pattern with preferably two sides of one box smaller than the other and may have the X stitching going corner to corner and preferably within the smaller box. The size of the Box-X stitching may be sized for the webbing being used. |
| D-L | Double Needle Lockstitch | Preferably the Hook and Loop strips may be sewn with a ⅜-inch gap between the double needle machine and may use a Type 301 lockstitch at preferably 7 to 13 stitches per inch of seam. |

Generally, materials used for devices according to the present invention should be compatible with exposure to a marine environment.

When a webbing material is used to make a device according to the present invention, e.g., in harnesses and straps, the cut ends of the webbing should be heat treated so as not to unravel.

While this invention has been described with various manners of connecting components, those skilled in the art would know that these connections may be only exemplary. For example, wherever box-x stitches (SX) are shown in the description, they may be replaced with other appropriate stitches of equivalent strength, such as, e.g., dual bar-tack. In some embodiments, the slide mechanism could be replaced with a buckle allowing adjustments.

In summary, in some aspects, this invention is preferably an inflatable animal life preserver device that may be used by dogs, cats, and other four-legged animal that may need protection from drowning when taken aboard a boat or vessel, where the owner wishes to provide a flotation device for their cherished pet or valuable property. FIGS. 1 through 34 provide the details for the invention. The invention is configured, sized, and designed to be quickly donned on the animal preferably by the use of quick release buckles and slides and adjusting straps on the harness. When placed in water, preferably the device may automatically inflate. The invention is designed to preferably enable the owner of the animal to inflate the device manually by pulling down on an inflation lanyard that may be provided on the device, or by blowing into an oral inflation tube that may be provided on the device. When inflated preferably the buoyancy of the device may float the animal in a horizontal position so as not to interfere with the animal's ability to "dog paddle". Preferably the animal may be suspended in equilibrium in a partially-submerged state, such that the animals head may be well clear of the water. The invention includes devices for the full size range of all four-legged animals. Each size inflatable animal device may be sized to fit the animal's body characteristics and preferably designed to provide the proper amount of buoyancy needed to float the animal based on the animal's shape and in-water weight. While FIGS. 1 through 34 show a single and double harness device, the invention shall includes multiple harness devices by adding additional "single harness", whereby each harness is permanently attached to one another by stitching additional webbing material in same construction method as used to form the double harness device.

The invention preferably consist of a radio-frequency (R-F) welded inflation chamber, a manual/automatic inflation system, $CO_2$ cylinder (sized for the amount of buoyancy needed for that size device), an oral inflation tube, a shroud, webbing (for the neck strap, lifting straps, and harness), buckles, slides, belt loops, tie tape (optional), Velcro® type hook and loop fastener, thread, and retro-reflective material (optional). While FIGS. 1 through 34 show a device using automatic inflation, the invention includes devices where the application (such as on a submersible vessel or commercial airlines) would call for a manually and/or oral inflation system. This invention has a unique design to preferably be lightweight and comfortable for the animal, and when inflated may provide all the buoyancy needed to assist the animal for a long period of time.

In some embodiments, the invention preferably includes optional retro-reflective material being added to the inflation chamber to aid search and rescue operations.

The invention preferably uses components that are used in manufacturing of U.S. Coast Guard approved personal flotation devices (PFDs) that are also Underwriters Laboratories© (UL) recognized or listed components for marine applications. Since there are no U.S. Coast Guard carriage requirements covered by the Code of Federal Regulations (CFR) for animal life preservers, the use of UL recognized or listed components is not a requirement for manufacturing of this invention. The invention may also be constructed using other manufacturer's $CO_2$ inflation systems.

The invention preferably includes adding thin foam panels (sized to fix within the shroud) and may provide enough inherent buoyancy to non-automatic inflating devices so they may float if accidentally dropped in the water. While foam is not needed on the fully automatic inflatable devices because they will inflate if accidentally dropped in the water, foam may be included for appears.

The invention preferably includes adding thin foam panels, preferably sized to fix within the front side shroud cover and may be used to provide a smooth outer surface and may be used to hide the outline of inflation system, the $CO_2$ cylinder, and/or the oral inflation tube.

While this invention has been described in conjunction with the specific embodiments outlined above, it is evident that many alternatives, modifications and variations will be apparent to those skilled in the art. Accordingly, the embodiments of the invention, as set forth above, are intended to be illustrative, not limiting. Various changes may be made without departing from the spirit and scope of the invention.

What is claimed is:

1. A life preserver for use by a four-legged animal for supporting the animal in a generally horizontal, partially submerged state of floating equilibrium in a body of water, the life preserver comprising:

an inflation chamber, the inflation chamber being constructed and adapted to be positioned under the animal's neck; and a harness system connected to the inflation chamber for attaching the life preserver to an animal, wherein, when worn inflated, the life preserver maintains an animal at or near the surface of the water, with the animal's head out of the water.

2. A life preserver as in claim 1 wherein the harness system comprises at least one adjustable harness for encircling the chest area of an animal.

3. A life preserver as in claim 2 wherein the harness system further comprises an adjustable harness for encircling the waist area of the animal.

4. A life preserver as in claim 1 wherein the inflation chamber is comprised of chamber material and an inflation system.

5. A life preserver as in claim 4 wherein the inflation system includes at least one of a manual inflation system, an automatic inflation system and an oral inflation tube.

6. A life preserver as in claim 5 wherein the inflation chamber, when uninflated, is adapted to be folded over and packed within a shroud.

7. A life preserver as in claim 4 wherein the inflation system includes an automatic inflation system comprises an automatic $CO_2$ inflation system.

8. A life preserver as in claim 4 wherein the inflation system includes a manual inflation system that comprises a manually activated $CO_2$ inflation system.

9. A life preserver as in any one of claims 1 further comprising the preserver includes retro-reflective material.

10. A life preserver as in claim 1 further comprising:

a lifting strap constructed and adapted for lifting the animal out of the water.

11. A life preserver as in claim 1 which, when worn by an animal in water, provides enough buoyancy around the neck and body to float the animal so that its head is out of the water.

12. A life preserver as in claim 1 which provides sufficient buoyancy to lift the animal's head out of the water, keeping the airway of a conscious animal out of the water.

13. A life preserver as in claim 1 which provides sufficient buoyancy to lift the animal's head out of the water, keeping the airway of an unconscious animal out of the water.

14. The life preserver of claim 1, further comprising:

a mechanism connected to the inflation chamber and to the harness system for positioning the inflation chamber under the animal's neck.

15. The life preserver of claim 14, wherein the mechanism comprises a neck strap connected to a portion of the inflation chamber located proximate to the animal's neck.

16. The life preserver of claim 15, wherein the length of the neck strap is adjustable.

17. The life preserver of claim 15, wherein, when worn, the neck strap attaches to a portion of the harness system located under the chest area of the animal.

18. The life preserver of claim 15, wherein the neck strap attaches to an adjustable harness for encircling the chest area of the animal.

19. A lifer preserver for use by a four-legged animal for supporting the animal in a generally horizontal, partially submerged state of floating equilibrium in a body of water, the lifer preserver comprising:

an inflation chamber comprised of an inflation system which includes at least one of a manual inflation system, an automatic inflation system and an oral inflation tube, the inflation chamber being constructed and adapted to be positioned under the animal's neck; and a harness system comprising at least one adjustable harness for encircling the chest area of the animal, the harness system connected to the inflation chamber for attaching the life preserver to an animal, wherein, when worn inflated, the life preserver maintains an animal at or near the surface of the water, with the animal's head out of the water, and wherein the inflation system includes an automatic inflation system comprises at least one of an automatic $CO_2$ inflation system and a manually activated $CO_2$ inflation system.

20. A lifer preserver for use by a four-legged animal for supporting the animal in a generally horizontal, partially submerged state of floating equilibrium in body of water, the lifer preserver comprising:

an inflation chamber comprised of an inflation system which includes at least one of a manual inflation system, an automatic inflation system and an oral inflation tube, the inflation chamber being constructed and adapted to be positioned under the animal's neck;

a harness system comprising at least one adjustable harness for encircling the chest area of the animal and at least one adjustable harness for encircling the waist area of the animal, the harness system connected to the inflation chamber for attaching the lifer preserver to an animal, wherein, when worn inflated, the lifer preserver maintains an animal at or near the surface of the water, with the animal's head out of the water, and wherein the inflation system includes an automatic inflation system comprises at least one of an automatic $CO_2$ inflation system and a manually activated $CO_2$ inflation system.

* * * * *